United States Patent
Su et al.

(10) Patent No.: US 11,153,599 B2
(45) Date of Patent: Oct. 19, 2021

(54) METHOD AND APPARATUS OF BI-DIRECTIONAL OPTICAL FLOW FOR VIDEO CODING

(71) Applicant: MEDIATEK INC., Hsinchu (TW)

(72) Inventors: Yu-Chi Su, Hsinchu (TW); Ching-Yeh Chen, Hsinchu (TW); Tzu-Der Chuang, Hsinchu (TW); Chen-Yen Lai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/251,008

(22) PCT Filed: Jun. 10, 2019

(86) PCT No.: PCT/CN2019/090560
§ 371 (c)(1),
(2) Date: Dec. 10, 2020

(87) PCT Pub. No.: WO2019/238008
PCT Pub. Date: Dec. 19, 2019

(65) Prior Publication Data
US 2021/0250604 A1    Aug. 12, 2021

Related U.S. Application Data

(60) Provisional application No. 62/719,186, filed on Aug. 17, 2018, provisional application No. 62/717,982, (Continued)

(51) Int. Cl.
*H04B 1/66* (2006.01)
*H04N 7/12* (2006.01)
(Continued)

(52) U.S. Cl.
CPC ........... *H04N 19/52* (2014.11); *H04N 19/174* (2014.11); *H04N 19/577* (2014.11)

(58) Field of Classification Search
CPC .............................. H04N 19/52; H04N 19/577
See application file for complete search history.

(56) References Cited

U.S. PATENT DOCUMENTS

| 10,798,385 | B2 | 10/2020 | Lee |
| 2010/0091846 | A1 | 4/2010 | Suzuki et al. |

(Continued)

FOREIGN PATENT DOCUMENTS

| CN | 102934444 A | 2/2013 |
| CN | 107925775 A | 4/2018 |

(Continued)

OTHER PUBLICATIONS

Chinese language office action dated Jan. 11, 2021, issued in application No. TW 108129241.

(Continued)

*Primary Examiner* — Fabio S Lima
(74) *Attorney, Agent, or Firm* — McClure, Qualey & Rodack, LLP (57) ABSTRACT

Method and apparatus of using Bi-directional optical flow (BIO) for a true bi-direction predicted block are disclosed. According to one method of the present invention, the gradients are limited to a predefined bit-depth in order to reduce the computational complexity. According to another method, the data range of gradient sum and/or the difference between L0 and L1 interpolated pixels are shifted by a predefined bit-depth. The pre-defined bit-depth can be implicitly determined or signalled in a bit stream at a sequence level, picture level or slice level. The pre-defined bit-depth can also be determined dependent on input bit-depth.

12 Claims, 3 Drawing Sheets

Related U.S. Application Data filed on Aug. 13, 2018, provisional application No. 62/703,959, filed on Jul. 27, 2018, provisional application No. 62/683,098, filed on Jun. 11, 2018.

(51) Int. Cl.
*H04N 11/02* (2006.01)
*H04N 11/04* (2006.01)
*H04N 19/52* (2014.01)
*H04N 19/174* (2014.01)
*H04N 19/577* (2014.01)

(56) References Cited

U.S. PATENT DOCUMENTS

| | | | |
|---|---|---|---|
| 2013/0083851 | A1 | 4/2013 | Alshin et al. |
| 2016/0029035 | A1 | 1/2016 | Nguyen et al. |
| 2017/0085917 | A1 | 3/2017 | Hannuksela et al. |
| 2017/0094305 | A1 | 3/2017 | Li et al. |
| 2018/0098070 | A1 | 4/2018 | Chuang et al. |
| 2018/0184117 | A1 | 6/2018 | Chen et al. |
| 2018/0249172 | A1* | 8/2018 | Chen ............ H04N 19/577 |
| 2018/0262773 | A1 | 9/2018 | Chuang et al. |
| 2018/0332298 | A1 | 11/2018 | Liu et al. |
| 2019/0045214 | A1* | 2/2019 | Ikai ............ H04N 19/196 |
| 2019/0200040 | A1 | 6/2019 | Lim et al. |
| 2019/0215521 | A1 | 7/2019 | Chuang et al. |
| 2019/0230350 | A1 | 7/2019 | Chen et al. |
| 2019/0320199 | A1 | 10/2019 | Chen et al. |
| 2020/0053364 | A1 | 2/2020 | Seo et al. |
| 2020/0053387 | A1 | 2/2020 | Lee |
| 2020/0221122 | A1* | 7/2020 | Ye ............ H04N 19/103 |
| 2020/0267383 | A1 | 8/2020 | Jun et al. |
| 2020/0351495 | A1* | 11/2020 | Li ............ H04N 19/54 |
| 2020/0366928 | A1 | 11/2020 | Liu et al. |
| 2021/0127133 | A1* | 4/2021 | Chen ............ H04N 19/577 |

FOREIGN PATENT DOCUMENTS

| | | | |
|---|---|---|---|
| TW | 201818723 A | 5/2018 | |
| TW | 201830968 A | 8/2018 | |
| WO | 2015/015058 A1 | 2/2015 | |
| WO | 2017/036399 A1 | 3/2017 | |
| WO | WO-2017036399 A1 * | 3/2017 | ......... H04N 19/176 |
| WO | 2017/188566 A1 | 11/2017 | |
| WO | 2018/044441 A1 | 3/2018 | |
| WO | 2018/084339 A1 | 5/2018 | |
| WO | 2018/129172 A1 | 7/2018 | |

OTHER PUBLICATIONS

International Search Report and Written Opinion dated Aug. 29, 2019, issued in application No. PCT/CN2019/090560.

Chinese language office action dated Jun. 20, 2020, issued in application No. TW 108120033.

International Search Report and Written Opinion dated Oct. 28, 2019, issued in application No. PCT/CN2019/101011.

Su, Y.C., et al.; "CE4.4.1: Generalized bi-prediction for inter coding;" Joint Video Experts Team (JVET) of ITU-T SG 16 WP 3 and ISO/IEC JTC 1/SC 29/WG 11; Jul. 3, 2018; pp. 1-13.

Chen, C.C., et al.; "Generalized bi-prediction for inter coding;" Joint Video Exploration Team (JVET) of ITU-T SG 16 WP 3 and ISO/IEC JTC 1/SC 29/WG 11; May 2016; pp. 1-18.

Non-Final office action dated Jul. 9, 2021, issued in U.S. Appl. No. 17/265,976.

* cited by examiner

METHOD AND APPARATUS OF BI-DIRECTIONAL OPTICAL FLOW FOR VIDEO CODING

CROSS REFERENCE TO RELATED APPLICATIONS

The present invention claims priority to U.S. Provisional Patent Application, Ser. No. 62/683,098, filed on Jun. 11, 2018, U.S. Provisional Patent Application, Ser. No. 62/703,959, filed on Jul. 27, 2018, U.S. Provisional Patent Application, Ser. No. 62/717,982, filed on Aug. 13, 2018 and U.S. Provisional Patent Application, Ser. No. 62/719,186, filed on Aug. 17, 2018. The U.S. Provisional Patent Applications are hereby incorporated by reference in their entireties.

FIELD OF THE INVENTION

The present invention relates to motion compensation using Bi-directional Optical flow (BIO) to refine motion for a bi-direction predicted block. In particular, the present invention relates to computational complexity reduction associated with the BIO process.

BACKGROUND AND RELATED ART

Bi-Directional Optical Flow (BIO)

Figure 1:
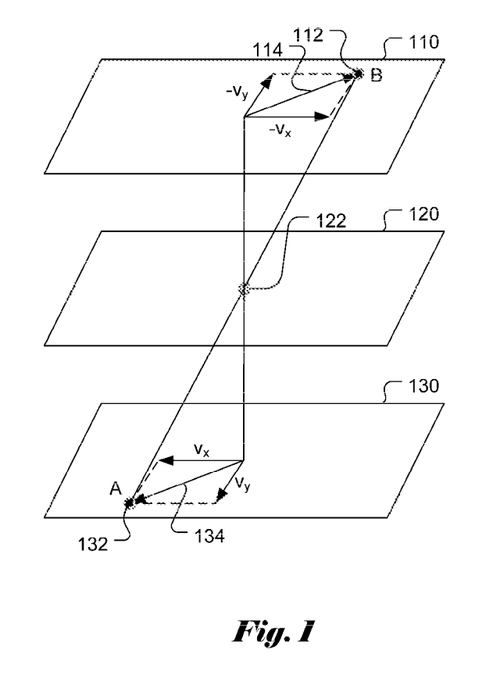
FIG. 1 illustrates an example of Bi-directional Optical Flow (BIO) to derive offset motion vector for motion refinement.

Bi-directional optical flow (BIO or BDOF) is motion estimation/compensation technique disclosed in JCTVC-C204 (E. Alshina, et al., *Bi-directional optical flow*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion as shown in FIG. 1, where a current pixel 122 in a B-slice (bi-prediction slice) 120 is predicted by one pixel in reference picture 0 (130) and one pixel in reference picture 1 (110). As shown in FIG. 1, the current pixel 122 is predicted by pixel B (112) in reference picture 1 (110) and pixel A (132) in reference picture 0 (130). In FIG. 1, $v_x$ and $v_y$ are pixel displacement vector in the x-direction and y-direction, which are derived using a bi-direction optical flow (BIO) model. It is applied only for truly bi-directional predicted blocks, which is predicted from two reference pictures corresponding to the previous picture and the latter picture. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computational complexity of BIO is much higher than that of traditional bi-directional prediction. In order to further improve the performance of BIO, the following methods are proposed.

In a conventional bi-prediction in HEVC, the predictor is generated using equation (1), where $P^{(0)}$ and $P^{(1)}$ are the list0 and list1 predictor, respectively.

$$P_{Conventional}[i,j]=(P^{(0)}[i,j]+P^{(1)}[i,j]+1)>>1 \quad (1)$$

In JCTVC-C204 and VECG-AZ05, the BIO predictor is generated using equation (2).

$$P_{OpticalFlow}=(P^{(0)}[i,j]+P^{(1)}[i,j]+v_x[i,j](I_x^{(0)}-I_x^{(1)}[i,j])+v_y[i,j](I_y^{(0)}-I_y^{(1)}[i,j])+1)>>1 \quad (2)$$

In equation (2), $I_x^{(0)}$ and $I_x^{(1)}$ represent the x-directional gradient in list0 and list1 predictor, respectively; $I_y^{(0)}$ and $I_y^{(1)}$ represent the y-directional gradient in list0 and list1 predictor, respectively; $v_x$ and $v_y$ represent the offsets or displacements in x- and y-direction, respectively. The derivation process of $v_x$ and $v_y$ is shown in the following. First, the cost function is defined as diffCost(x, y) to find the best values $v_x$ and $v_y$. In order to find the best values $v_x$ and $v_y$ to minimize the cost function, diffCost(x, y), one 5×5 window is used. The solutions of $v_x$ and $v_y$ can be represented by using $S_1$, $S_2$, $S_3$, $S_5$, and $S_6$. diffCost(x, y)

$$= \sum_{\Omega} \left( P^0(x,y) + v_x \frac{\partial P^0(x,y)}{\partial x} + v_y \frac{\partial P^0(x,y)}{\partial y} - \left( P^1(x,y) - v_x \frac{\partial P^1(x,y)}{\partial x} - v_y \frac{\partial P^1(x,y)}{\partial y} \right) \right)^2 ,$$

$$= \sum_{\Omega} \left( P^0(x,y) - P^1(x,y) + v_x \left( \frac{\partial P^0(x,y)}{\partial x} + \frac{\partial P^1(x,y)}{\partial x} \right) + v_y \left( \frac{\partial P^0(x,y)}{\partial y} + \frac{\partial P^1(x,y)}{\partial y} \right) \right)^2 . \quad (3)$$

The minimum cost function, mindiffCost(x,y) can be derived according to:

$$\frac{\partial diffCost(x,y)}{\partial v_x} = 0, \quad \frac{\partial diffCost(x,y)}{\partial v_y} = 0. \quad (4)$$

By solving equations (3) and (4), $v_x$ and $v_y$ can be solved according to eqn. (5):

$$v_x = \frac{S_3 S_5 - S_2 S_6}{S_1 S_5 - S_2 S_2}, \quad v_y = \frac{S_1 S_6 - S_3 S_2}{S_1 S_5 - S_2 S_2} \text{ where,} \quad (5)$$

$$S_1 = \sum_{\Omega} \left( \frac{\partial P^0(x,y)}{\partial x} + \frac{\partial P^1(x,y)}{\partial x} \right)^2 ,$$

$$S_2 = \sum_{\Omega} \left( \frac{\partial P^0(x,y)}{\partial x} + \frac{\partial P^1(x,y)}{\partial x} \right) \left( \frac{\partial P^0(x,y)}{\partial y} + \frac{\partial P^1(x,y)}{\partial y} \right)$$

$$S_3 = -\sum_{\Omega} \left( \frac{\partial P^0(x,y)}{\partial x} + \frac{\partial P^1(x,y)}{\partial x} \right) (P^0(x,y) - P^1(x,y)),$$

$$S_5 = \sum_{\Omega} \left( \frac{\partial P^0(x,y)}{\partial y} + \frac{\partial P^1(x,y)}{\partial y} \right)^2$$

$$S_6 = -\sum_{\Omega} \left( \frac{\partial P^0(x,y)}{\partial y} + \frac{\partial P^1(x,y)}{\partial y} \right) (P^0(x,y) - P^1(x,y)).$$

In the above equations, $$\frac{\partial P^0(x,y)}{\partial x}$$

corresponds to the x-direction gradient of a pixel at (x,y) in the list 0 picture, $$\frac{\partial P^1(x, y)}{\partial x}$$

corresponds to the x-direction gradient of a pixel at (x,y) in the list 1 picture, $$\frac{\partial P^0(x, y)}{\partial y}$$

corresponds to the y-direction gradient of a pixel at (x,y) in the list 0 picture, and $$\frac{\partial P^1(x, y)}{\partial y}$$

corresponds to the y-direction gradient of a pixel at (x,y) in the list 1 picture.

In some related art, the $S_2$ can be ignored, and $v_x$ and $v_y$ can be solved according to $$v_x = \frac{S_3}{S_1}, v_y = \frac{S_6 - v_x S_2}{S_5} \text{ where,} \quad (6)$$

$$S_1 = \sum_\Omega \left( \frac{\partial P^0(x, y)}{\partial x} + \frac{\partial P^1(x, y)}{\partial x} \right)^2,$$

$$S_2 = \sum_\Omega \left( \frac{\partial P^0(x, y)}{\partial x} + \frac{\partial P^1(x, y)}{\partial x} \right)\left( \frac{\partial P^0(x, y)}{\partial y} + \frac{\partial P^1(x, y)}{\partial y} \right)$$

$$S_3 = -\sum_\Omega \left( \frac{\partial P^0(x, y)}{\partial x} + \frac{\partial P^1(x, y)}{\partial x} \right)(P^0(x, y) - P^1(x, y)),$$

$$S_5 = \sum_\Omega \left( \frac{\partial P^0(x, y)}{\partial y} + \frac{\partial P^1(x, y)}{\partial y} \right)^2$$

$$S_6 = -\sum_\Omega \left( \frac{\partial P^0(x, y)}{\partial y} + \frac{\partial P^1(x, y)}{\partial y} \right)(P^0(x, y) - P^1(x, y))$$

In the above equations, parameters $S_1$, $S_2$, $S_3$, $S_5$, and $S_6$ are related to the x-direction gradient and the y-direction gradient. For example, $S_1$ is calculated from the sum of the x-direction gradient of the reference block in list 0 and the x-direction gradient of the reference block in list 1. The square of the sum is used as $S_1$. $S_5$ is calculated from the sum of the y-direction gradient of the reference block in list 0 and the y-direction gradient of the reference block in list 1. The square of the sum is used as $S_5$. For convenience, parameters $S_1$, $S_2$, $S_3$, $S_5$, and $S_6$ are referred as gradient parameters in this disclosure. In practice, gradient parameters $S_1$, $S_2$, $S_3$, $S_5$, and $S_6$ often use fixed-point representation with a pre-defined bit-depth. Derivation of $v_x$ and $v_y$ will require multiplication, addition and division operations. Among which, the division operation is more costly in implementation.

We can find that the required bit-depth is large in the BIO process, especially for calculating $S_1$, $S_2$, $S_3$, $S_5$, and $S_6$. For example, if the bit-depth of pixel value in video sequences is 10 bits and the bit-depth of gradients is increased by fractional interpolation filter or gradient filter, then 16 bits are required to represent one x-directional gradient or one y-directional gradient. These 16 bits may be further reduced by gradient shift equal to 4, so that one gradient needs 12 bits to represent the value. Even if the magnitude of gradient can be reduced to 12 bits by gradient shift, the required bit-depth of BIO operations is still large. One multiplier with 13 bits by 13 bits is required to calculate $S_1$, $S_2$, and $S_5$. Another multiplier with 13 bits by 17 bits is required to obtain $S_3$, and $S_6$. When the window size is large, more than 32 bits are required to represent $S_1$, $S_2$, $S_3$, $S_5$, and $S_6$. In order to reduce the required bit-depth, various methods are disclosed in the present invention.

Generalized Bi-Prediction (GBi)

Generalized bi-prediction (GBi) is proposed in JVET-00047 (C. Chen, et al., "*Generalized bi-prediction for inter coding*", in Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-00047). The concept of GBi is to allow the use different weights for predictors from L0 and L1, respectively, instead of using equal weights in traditional bi-prediction. The predictor generation can be summarized in Eq. (7) and (8).

$$P_{TraditionalBiPred} = (P_{L0} + P_{L1} + \text{RoundingOffset}) \gg \text{shiftNum} \quad (7)$$

$$P_{GBi} = (w_0 * P_{L0} + w_1 * P_{L1} + \text{RoundingOffset}_{GBi}) \gg \text{shiftNum}_{GBi}. \quad (8)$$

In the above equations, $P_{TraditionalBiPred}$ and $P_{GBi}$ are final predictors for traditional bi-prediction and GBi respectively, $P_{L0}$ and $P_{L1}$ are predictors from L0 and L1, $w_0$ and $w_1$ are selected GBi weights for L0 and L1, and RoundingOffset, shiftNum, RoundingOffset1, and shiftNum1 are used to normalize the final predictors in traditional bi-prediction and GBi respectively. For AMVP mode (i.e., normal Inter prediction mode), the weight selection in GBi is explicitly signalled for one CU if this CU is coded in the bi-prediction mode. For Merge mode, the weight selection is inherited from the Merge candidate.

BRIEF SUMMARY OF THE INVENTION

Method and apparatus of using Bi-directional optical flow (BIO) for a true bi-direction predicted block are disclosed. According to one method of the present invention, input data associated with a current block in a current picture are received, where the current block is coded using bi-direction prediction. A first reference block associated with the current block in a first reference picture from reference picture list 0 and a second reference block associated with the current block in a second reference picture from reference picture list 1 are determined where the first reference block and the second reference block are pointed by true bi-direction motion vectors. First x-gradients and first y-gradients are derived based on the first reference block, and second x-gradients and second y-gradients based on the second reference block. Data range related to the first x-gradients, the first y-gradients, the second x-gradients and the second y-gradients are limited to a pre-defined bit-depth to generate range-limited first x-gradients, range-limited first y-gradients, range-limited second x-gradients and range-limited second y-gradients. A set of gradient parameters is derived based on first information, wherein the first information comprising the range-limited first x-gradients, the range-limited first y-gradients, the range-limited second x-gradients, the range-limited second y-gradients. X-motion offset and y-motion offset are derived based on the set of gradient parameters. A refined predictor is generated for the current block based on second information, wherein the second information comprising the x-motion offset and the y-motion offset. The current block is encoded or decoded based on the refined predictor.

In one embodiment, if the first x-gradients, the first y-gradients, the second x-gradients and the second y-gradients are greater than a maximum value or smaller than a minimum value, the first x-gradients, the first y-gradients, the second x-gradients and the second y-gradients are clipped to an allowable value indicated by the pre-defined bit-depth.

According to another method, first x-gradients and first y-gradients are derived based on the first reference block, and second x-gradients and second y-gradients based on the second reference block. X-gradient sums are derived based on the first x-gradients and the second x-gradients; y-gradient sums are derived based on the first y-gradients and the second y-gradients; reference differences between interpolated pixels in the first reference block and the second reference block are derived; and where a data range for the x-gradient sums and the y-gradient sums, the reference differences, or both are shifted by a first pre-defined bit-depth. X-motion offset and y-motion offset are derived using first information, wherein the first information comprising the x-gradient sums, the y-gradient sums, and the reference differences. A refined predictor for the current block is generated based on second information, wherein the second information comprising the x-motion offset and the y-motion offset. The current block is encoded or decoded based on the refined predictor.

In one embodiment, the data range for the x-gradient sums and the y-gradient sums, the reference differences, or both are limited to a second pre-defined bit-depth prior to being shifted by the first pre-defined bit-depth. In another embodiment, the data range for the x-gradient sums and the y-gradient sums, the reference differences, or both are limited to a second pre-defined bit-depth after being shifted by the first pre-defined bit-depth.

In the above methods, the first pre-defined bit-depth can be implicitly determined. The first pre-defined bit-depth can be determined dependent on input bit-depth. The first pre-defined bit-depth can be signalled in a bit stream at a sequence level, picture level or slice level.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, Bi-directional Optical Flow (BIO or BDOF) technique refines bi-directional motion vectors to improve motion-compensation performance. However, the BIO or BDOF process involves complicated operations. Furthermore, the operations involve multipliers with high accuracy. In order to reduce the complexity, some complexity reduction techniques can be used in practice. For example, in one implication, the data range associated with gradients is reduced by right shifting the difference and sum between L0 and L1 interpolated pixels to reduce the data range according to the following equations:

$$S_1 = \sum_\Omega \left(\left(\frac{\partial P^0(x,y)}{\partial x} + \frac{\partial P^1(x,y)}{\partial x}\right) \gg \text{shift}\right)^2, \quad (9)$$

$$S_2 = \sum_\Omega \left(\left(\frac{\partial P^0(x,y)}{\partial x} + \frac{\partial P^1(x,y)}{\partial x}\right) \gg \text{shift}\right) \quad (10)$$

$$\left(\left(\frac{\partial P^0(x,y)}{\partial y} + \frac{\partial P^1(x,y)}{\partial y}\right) \gg \text{shift}\right),$$

$$S_3 = -\sum_\Omega \left(\left(\frac{\partial P^0(x,y)}{\partial x} + \frac{\partial P^1(x,y)}{\partial x}\right) \gg \text{shift}\right) \quad (11)$$

$$((P^0(x,y) \gg \text{shiftA}) - (P^1(x,y) \gg \text{shiftA})),$$

$$S_5 = \sum_\Omega \left(\left(\frac{\partial P^0(x,y)}{\partial y} + \frac{\partial P^1(x,y)}{\partial y}\right) \gg \text{shift}\right)^2, \quad (12)$$

$$S_6 = -\sum_\Omega \left(\left(\frac{\partial P^0(x,y)}{\partial y} + \frac{\partial P^1(x,y)}{\partial y}\right) \gg \text{shift}\right) \quad (13)$$

$$((P^0(x,y) \gg \text{shiftA}) - (P^1(x,y) \gg \text{shiftA})),$$

In the above equations, shift=max(4,(bitDepth−8)), and shiftA=max(1,(bitDepth−11)).

Method 1. Limiting the Data Range of Gradients

While the gradient shift can reduce the data range of gradients and control the precision of gradients, it is not enough to limit the data range of gradients by using gradient shift only. Accordingly, a method is disclosed to limit the data range of gradients to a pre-defined bit-depth. If the gradients are larger than the allowed maximum or smaller than the allowed minimum, the gradients are clipped to the allowed value. For example, we can limit the data range of gradients to 10 bits, so that the multipliers can be reduced to 11 bits by 11 bits and 11 bits by 17 bits. In another embodiment, the data range of gradients is limited into 8 bits, so that the multiplier can be reduced to 9 bits by 9 bits and 9 bits by 17 bits. The data range can be implicitly pre-defined values, depending on the input bit-depth, or explicitly signalled to the decoder in the bit stream at a sequence level, picture level, or slice level. In another embodiment, when the gradients are larger than the allowed maximum or smaller than the allowed minimum, the BIO process is skipped.

Method 2. Limiting the Data Range of Gradient Sum and/or the Difference Between L0 and L1 Interpolated Pixels The inputs of multipliers in BIO process is the sum of L0 and L1 gradients or the difference between L0 and L1 interpolated pixels. According to this method, limit is imposed to the data range of the sum of L0 and L1 gradients or the difference between L0 and L1 interpolated pixels, instead of the gradients and interpolated pixels directly. In one embodiment, the limit is imposed on the data range of the sum of L0 and L1 gradients and/or the difference between L0 and L1 interpolated pixels in some pre-defined bit-depth. For example, we can limit the data range of the sum of L0 and L1 gradients and the difference between L0 and L1 interpolated pixels to 10 bits, respectively, so that the multipliers can be reduced to 10 bits by 10 bits and 10 bits by 10 bits. In another embodiment, the data range of gradients is limited into 8 bits, so that the multiplier can be reduced to 8 bits by 8 bits and 8 bits by 8 bits. The data range constraint can be applied to the sum of L0 and L1 gradients only, applied to the differences between L0 and L1 interpolated pixels only, or applied to both. The data ranges of the sum of L0 and L1 gradients and the difference between L0 and L1 interpolated pixels can be the same or can be different. The data ranges can be implicitly pre-defined values, depending on the input bit depth, or explicitly signalled to the decoder in the bit stream at a sequence level, picture level or slice level. In another embodiment, when the sum of L0 and L1 gradients or the difference between L0 and L1 interpolated pixels are larger than the allowed maximum or smaller than the allowed minimum, the BIO process is skipped.

In one embodiment, those data out of the allowed range are not used to derive displacements in BIO process. In another embodiment, those data out of the allowed range are not used to derive displacements in BIO process and those pixels are not refined by BIO.

In one embodiment, Method 1 and Method 2 can be combined together to reduce the required bit depth. For example, we limit the data range of gradients and the data range of the difference between L0 and L1 interpolated pixels to 10 bits. Therefore, the multipliers can be reduced to 11 bits by 11 bits and 11 bits by 10 bits. In another embodiment, when the data range of gradients or the difference between L0 and L1 interpolated pixels are larger than the allowed maximum or smaller than the allowed minimum, the BIO process is skipped.

Method 3. Shifting the Data Range of Gradient Sum and/or the Difference Between L0 and L1 Interpolated Pixels In one embodiment, we propose to shift the data range of gradients sum in some pre-defined bit-depth. For example, we can right shift the data range of gradient sum by 4 bits so the multipliers can be reduced to 8 bits by 8 bits and 8 bits by 15 bits. In another embodiment, we can also right shift the data range of the difference between L0 and L1 interpolated pixels. For example, the data range of the difference between L0 and L1 interpolated pixels can be right shifted by 4 bits so that the multipliers can be reduced to 12 bits by 12 bits and 12 bits by 11 bits. In one embodiment, both the data range of gradient sum and the difference between L0 and L1 interpolated pixels can be shifted. For example, both the gradients sum and the data range of the difference between L0 and L1 interpolated pixels can be right shifted by 4 bits so that the multipliers can be reduced to 8 bits by 8 bits and 8 bits by 11 bits. In another example, we right shift the gradient sum by 4 bits and right shift the difference between L0 and L1 interpolated pixels by 7 bits. In this way, the multipliers can be reduced to 8 bits by 8 bits and 8 bits by 8 bits. The shifting number for the gradient sum or the difference between L0 and L1 can be implicitly pre-defined values, dependent on the input bit-depth, or explicitly signalled to the decoder in a bit stream at a sequence level, picture level, or slice level.

Method 4. Limiting and Shifting the Data Range of Gradient Sum and/or Limit and Shift the Difference Between L0 and L1 Interpolated Pixels In one embodiment, we propose to limit the data range of gradients sum in some pre-defined bit-depth and then shift it. The order of clipping and the shift operation can be switched and the clipping value and the shifting value can be set to arbitrary number according to requirement of applications. For example, we can limit the data range of gradient sum to 10 bit and then right shift the gradient sum by 2 bits. Therefore, the multipliers can be reduced to 8 bits by 8 bits and 8 bits by 15 bits. In another embodiment, the data range of the difference between L0 and L1 can be clipped to 12 bit and then the resulted value is right shifted by 1 bit. The multipliers become 12 bits by 12 bits and 12 bits by 11 bits. In one embodiment, we can limit and shift the gradient sum as well as the difference between L0 and L1 interpolated pixels. For example, we can limit the data range of the gradient sum to 10 bit and then right shift the gradient sum by 2 bits. Next, we limit the data range for the difference between L0 and L1 interpolated pixels to 12 bit and then right shift it by 1 bit. In this way, the multipliers are reduced to 8 bits by 8 bits and 8 bits by 11 bits. Moreover, all of the parameters, $S_1$, $S_2$, $S_3$, $S_5$ and $S_6$ can be represented in 32 bits. More examples for the combination of the limiting data range and shift operation for gradient sum and the difference between L0 and L1 interpolated pixels are shown in Table 1. The limited range and the shifting value for the data range of gradient sum or the difference between L0 and L1 can be implicitly pre-defined values, dependent on the input bit-depth, or explicitly signalled to the decoder in a bit stream at a sequence level, picture level, or slice level.

TABLE 1

|  | Limited range for gradient sum | Shifting number for gradient sum | Limited range for the difference between L0 and L1 | Shifting number for the difference between L0 and L1 | Number of bits for multiplication | Number of bits to represent $S_1$, $S_2$, $S_3$, $S_5$ and $S_6$ |
|---|---|---|---|---|---|---|
| Example A | 10 | 2 | 12 | 1 | 8 bits by 8 bits and 8 bits by 11 bits | All 32 bits |

TABLE 1-continued

| | Limited range for gradient sum | Shifting number for gradient sum | Limited range for the difference between L0 and L1 | Shifting number for the difference between L0 and L1 | Number of bits for multiplication | Number of bits to represent $S_1$, $S_2$, $S_3$, $S_5$ and $S_6$ |
|---|---|---|---|---|---|---|
| Example B | 10 | 3 | 12 | 1 | 7 bits by 7 bits and 7 bits by 11 bits | All 32 bits |
| Example C | 10 | 3 | 12 | 2 | 7 bits by 7 bits and 7 bits by 10 bits | All 32 bits |
| Example D | 10 | 3 | 12 | 3 | 7 bits by 7 bits and 7 bits by 9 bits | All 32 bits |
| Example E | 10 | 4 | 12 | 5 | 6 bits by 6 bits and 6 bits by 7 bits | All 32 bits |
| Example F | 10 | 4 | 12 | 7 | 6 bits by 6 bits and 6 bits by 5 bits | All 32 bits |

Method 5. Calculating Gradients of Reference Pixels Directly

According to existing practice, gradients are calculated by using two different methods. The first one is to apply one motion-phase-dependent filter to reference pixels. According to this method, one additional set of gradient filters and one additional set of interpolation filters are required to perform gradient calculation. The other method is to apply one fixed filter (e.g. 3-tap filter or 5-tap filter) to interpolate pixels. In this way, there is no need of additional filter sets for the gradient calculation. However, the data dependency between interpolated pixels and gradient calculation is introduced. In order to remove this data dependency, we propose to apply one fixed filter to reference pixels directly. In one embodiment, the MV is first rounded to an integer MV. The gradients are derived by applying one fixed filter (e.g. 3-tap filter or 5-tap filter) to reference pixels directly without considering the fractional part of MV. For example, if the MV is (0.25, −0.25), then the rounded MV becomes (0, 0). If 3-tap filter with filter coefficients equal to [−1, 0, 1] is used to calculate gradients, the horizontal gradient is calculated by using the reference pixels at position (1, 0) and (−1, 0), and the vertical gradient is calculated by using the reference pixels at position (0, 1) and (0, −1). By using this method, the data dependency between interpolated pixels and gradient calculation can be removed.

In another embodiment, four nearest integer reference pixels around the position pointed by MV are used to calculate gradients. For example, if the MV is (0.25, −0.25), then the reference pixels at position (0, 0), (1, 0), (0, −1), and (1, −1) are used to calculate gradient. The horizontal gradient is derived by averaging the difference between the reference pixels at position (0, 0) and (1, 0) and the difference between the reference pixels at position (0, −1) and (1, −1). The vertical gradient is derived by averaging the difference between the reference pixels at position (0, −1) and (0, 0) and the difference between the reference pixels at position (1, −1) and (1, 0). In another embodiment, three nearest integer reference pixels around the position pointed by MV are used to calculate gradients. For example, if the MV is (0.25, −0.25), then the reference pixels at position (0, 0), (1, 0), and (0, −1) are used to calculate gradient. The horizontal gradient is derived by calculating the difference between the reference pixels at position (0, 0) and (1, 0). The vertical gradient is derived by calculating the difference between the reference pixels at position (0, −1) and (0, 0).

In another embodiment, a predefined weighting pair can be applied to calculate gradients. For example, if the MV is (0.25, −0.25), then the reference pixels at position (0, 0), (1, 0), (0, −1), and (1, −1) are used to calculate gradient. The horizontal gradient is derived by a summation of the difference between the reference pixels at position (0, 0) and (1, 0) multiplying a weighting (e.g. 0.25) and the difference between the reference pixels at position (0, −1) and (1, −1) multiplying a weighting (e.g. 0.75). The vertical gradient is derived by the difference between the reference pixels at position (0, −1) and (0, 0) multiplying a weighting (e.g. 0.25) and the difference between the reference pixels at position (1, −1) and (1, 0) multiplying a weighting (e.g. 0.75). The value of weighting pair (e.g. [0.25, 0.75]), can be any two numbers with the sum equal to 1.

Method 6. Calculating gradients after horizontal interpolation filter

In Method 5, we can totally remove data dependency by applying one fixed filter to reference pixels directly. The precision of gradients for fractional MVs will be ignored at the same time. For example, even if MVs have different fractional parts, MVs will be rounded first to integer MVs and the rounded MVs become to point to the same reference pixels. In order to reduce data dependency and preserve some precision of gradients for fractional MVs, we propose to apply one fixed filter to the output pixels generated after a horizontal interpolation filter, in which the horizontally fractional part of MVs are considered. For example, reference pixels will be generated by a horizontal interpolation filter, where gradients are derived by applying one fixed filter (e.g. 3-tap filter or 5-tap filter) to the output pixels by taking into consideration of the horizontal fractional part of MV.

Method 7. Interaction Between GBi and BIO

In BIO, the L0 and L1 interpolated pixels would be updated based on the theory of optical flow while GBi allows different weights for L0 and L1 interpolated pixels for the final blending of the predicted block. Both of the two coding tools aim to enhance the prediction performance in bi-prediction mode. We can enable one of the two coding tools to avoid the performance affected by the other and save the runtime as well. In one embodiment, GBi can be disabled when BIO is on. In this case, the equal weight for L0 and L1 somehow satisfies the assumption that the equal offset of local motion vectors for L0 and L1 in BIO.

In some cases, the difference between the reference picture from L0 and the reference picture from L1 of the current picture of are quite different. In this case, the assumption of equal movement for local motion vectors from L0 and L1 in BIO is not correct. In one embodiment, we can enable GBi and BIO at the same time to get the additional coding gains from these two coding tools. In another embodiment, when BIO is enabled, only part of weight selections can be used. In another embodiment, the supported GBi weights when BIO is enabled can be different to the GBi weights when BIO is disabled. The supported GBi weights can be pre-defined or signalled to the decoder when BIO is enabled. The selection methods can be based on the difference of picture order count (POC) between the current picture and the reference picture from L0 and L1. For example, if the POC of the reference picture from L0, the current picture, and the reference picture from L1 is 1, 2, and 7, respectively, then the difference of the POCs between the current picture and the reference picture from L0 (called diff_POC0) and the difference of the POC between the current picture and the reference picture from L1 (called diff_POC1) are 1 and 5, respectively. The difference between diff_POC0 and diff_POC1 is 4, called diff_POC0_POC1. If diff_POC0_POC1 is larger than a pre-defined threshold, the BIO can be enabled with some selected weight from GBi. The condition to determine the selected weights can be determined by the information related to QP (quantization parameter), POC, the temporal layer ID or any combination of these factors.

Any of the foregoing proposed methods can be implemented in encoders and/or decoders. For example, any of the proposed methods can be implemented in a inter prediction module or the reconstruction process of an encoder, and/or a inter prediction module or the reconstruction process of a decoder. Alternatively, any of the proposed methods can be implemented as a circuit coupled to the inter prediction module or the reconstruction process of the encoder and/or the inter prediction module or the reconstruction process of the decoder.

Figure 2:
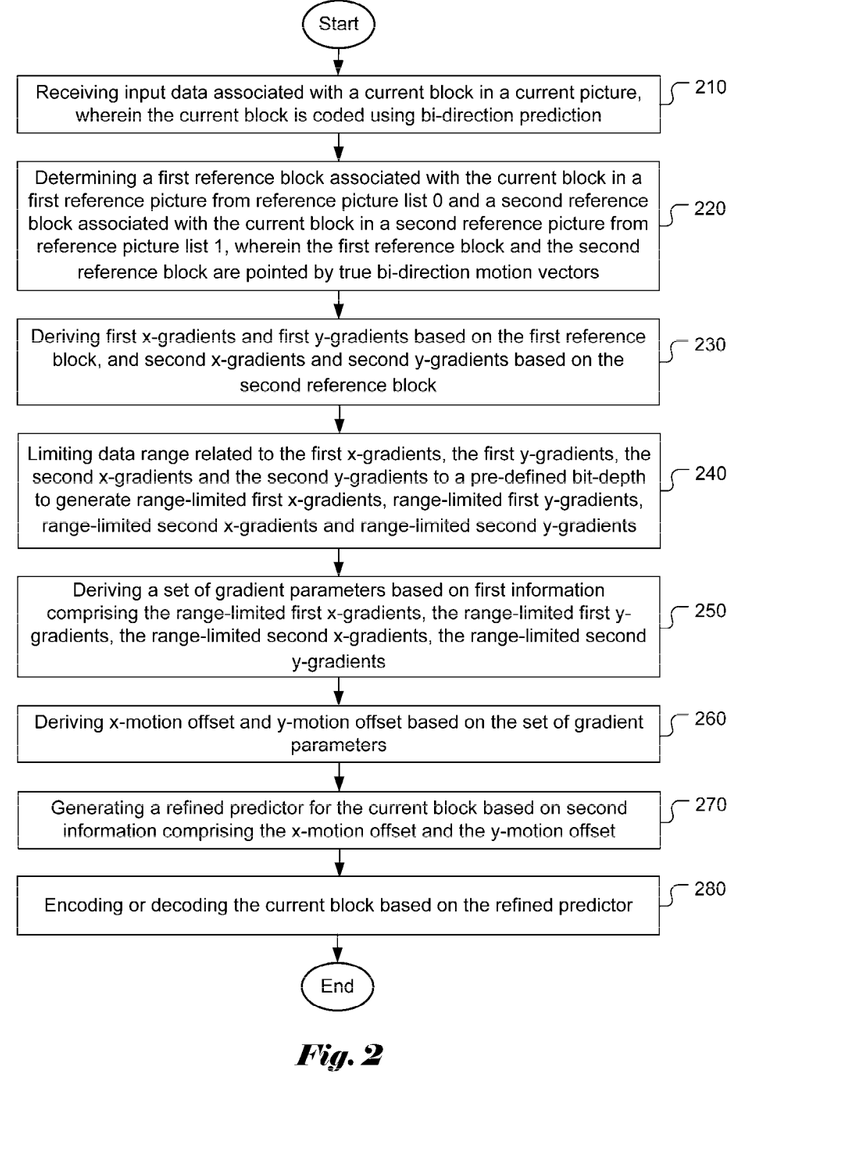
FIG. 2 illustrates an exemplary flowchart of a video coding system using bi-directional optical flow (BIO) to refine motion for a bi-direction predicted block according to an embodiment of the present invention, where the data range of gradients are limited to a predefined bit-depth.

FIG. 2 illustrates an exemplary flowchart of a video coding (for example, encoding and/or decoding) system using bi-directional optical flow (BIO) to refine motion for a bi-direction predicted block according to an embodiment of the present invention, where the data range of gradients are limited to a predefined bit-depth. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 210, where the current block is coded (for example, encoded and/or decoded) using bi-direction prediction. A first reference block associated with the current block in a first reference picture from reference picture list 0 and a second reference block associated with the current block in a second reference picture from reference picture list 1 are determined in Step 220, wherein the first reference block and the second reference block are pointed by true bi-direction motion vectors. First x-gradients and first y-gradients are derived based on the first reference block, and second x-gradients and second y-gradients are derived based on the second reference block in step 230. Data range related to the first x-gradients, the first y-gradients, the second x-gradients and the second y-gradients are limited to a pre-defined bit-depth to generate range-limited first x-gradients, range-limited first y-gradients, range-limited second x-gradients and range-limited second y-gradients in step 240. A set of gradient parameters is generated based on first information, wherein the first information comprising the range-limited first x-gradients, the range-limited first y-gradients, the range-limited second x-gradients, the range-limited second y-gradients in step 250. X-motion offset and y-motion offset are derived based on the set of gradient parameters in step 260. A refined predictor is generated for the current block based on second information in step 270, wherein the second information comprising the x-motion offset and the y-motion offset. The current block is encoded or decoded based on the refined predictor in step 280.

Figure 3:
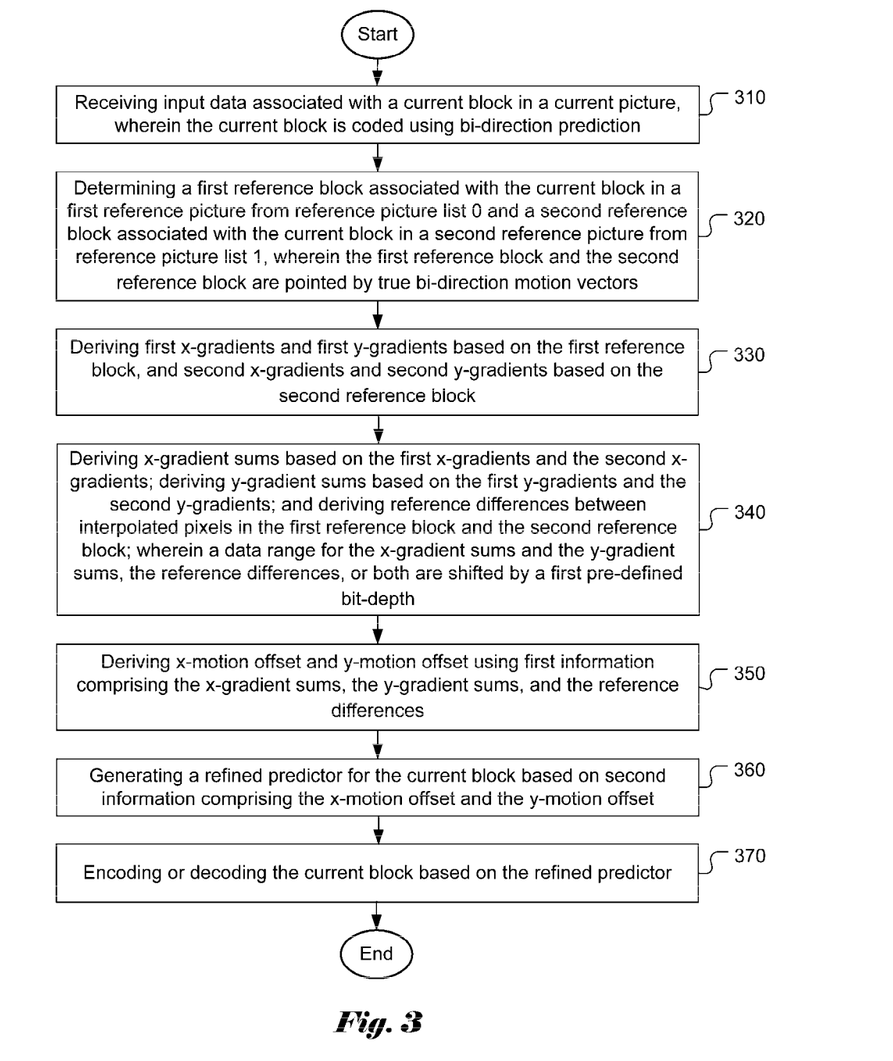
FIG. 3 illustrates an exemplary flowchart of a video coding system using bi-directional optical flow (BIO) to refine predictor for a bi-direction predicted block according to an embodiment of the present invention, where the data range of gradient sum and/or the difference between L0 and L1 interpolated pixels are shifted.

FIG. 3 illustrates an exemplary flowchart of a video coding (for example, encoding and/or decoding) system using bi-directional optical flow (BIO) to refine predictor for a bi-direction predicted block according to an embodiment of the present invention, where the data range of gradient sum and/or the difference between L0 and L1 interpolated pixels are shifted. According to this method, input data associated with a current block in a current picture is received in step 310, where the current block is coded (for example, encoded and/or decoded) using bi-direction prediction. A first reference block associated with the current block in a first reference picture from reference picture list 0 and a second reference block associated with the current block in a second reference picture from reference picture list 1 are determined in step 320, wherein the first reference block and the second reference block are pointed by true bi-direction motion vectors. First x-gradients and first y-gradients are derived based on the first reference block, and second x-gradients and second y-gradients are derived based on the second reference block in step 330. In step 340, x-gradient sums are derived based on the first x-gradients and the second x-gradients; y-gradient sums are derived based on the first y-gradients and the second y-gradients; and reference differences between interpolated pixels in the first reference block and the second reference block are derived; wherein a data range for the x-gradient sums and the y-gradient sums, the reference differences, or both are shifted by a first pre-defined bit-depth. In step 350, x-motion offset and y-motion offset using first information are derived, wherein the first information comprising the x-gradient sums, the y-gradient sums, and the reference differences. A refined predictor for the current block is generated based on second information, wherein the second information comprising the x-motion offset and the y-motion offset in step 360. The current block is encoded or decoded based on the refined predictor in step 370.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using Bi-directional optical flow (BIO) for a true bi-direction predicted block, the method comprising:

receiving input data associated with a current block in a current picture, wherein the current block is coded using bi-direction prediction;

determining a first reference block associated with the current block in a first reference picture from reference picture list 0 and a second reference block associated with the current block in a second reference picture from reference picture list 1, wherein the first reference block and the second reference block are pointed by true bi-direction motion vectors;

deriving first x-gradients and first y-gradients based on the first reference block, and second x-gradients and second y-gradients based on the second reference block, wherein data range related to the first x-gradients, the first y-gradients, the second x-gradients and the second y-gradients are limited to a pre-defined bit-depth to generate range-limited first x-gradients, range-limited first y-gradients, range-limited second x-gradients and range-limited second y-gradients;

deriving a set of gradient parameters based on first information, wherein the first information comprising the range-limited first x-gradients, the range-limited first y-gradients, the range-limited second x-gradients, the range-limited second y-gradients;

deriving x-motion offset and y-motion offset based on the set of gradient parameters;

generating a refined predictor for the current block based on second information, wherein the second information comprising the x-motion offset and the y-motion offset; and encoding or decoding the current block based on the refined predictor.

2. The method of claim 1, wherein if the first x-gradients, the first y-gradients, the second x-gradients and the second y-gradients are greater than a maximum value or smaller than a minimum value, the first x-gradients, the first y-gradients, the second x-gradients and the second y-gradients are clipped to an allowable value indicated by the pre-defined bit-depth.

3. The method of claim 1, wherein the pre-defined bit-depth is implicitly determined.

4. The method of claim 1, wherein the pre-defined bit-depth is determined dependent on input bit-depth.

5. The method of claim 1, wherein the pre-defined bit-depth is signalled in a bit stream at a sequence level, picture level or slice level.

6. A method of video coding using Bi-directional optical flow (BIO) for a true bi-direction predicted block, the method comprising:

receiving input data associated with a current block in a current picture, wherein the current block is coded using bi-direction prediction;

determining a first reference block associated with the current block in a first reference picture from reference picture list 0 and a second reference block associated with the current block in a second reference picture from reference picture list 1, wherein the first reference block and the second reference block are pointed by true bi-direction motion vectors;

deriving first x-gradients and first y-gradients based on the first reference block, and second x-gradients and second y-gradients based on the second reference block;

deriving x-gradient sums based on the first x-gradients and the second x-gradients; deriving y-gradient sums based on the first y-gradients and the second y-gradients; and deriving reference differences between interpolated pixels in the first reference block and the second reference block; wherein a data range for the x-gradient sums and the y-gradient sums, the reference differences, or both are shifted by a first pre-defined bit-depth;

deriving x-motion offset and y-motion offset using first information, wherein the first information comprising the x-gradient sums, the y-gradient sums, and the reference differences;

generating a refined predictor for the current block based on second information, wherein the second information comprising the x-motion offset and the y-motion offset; and encoding or decoding the current block based on the refined predictor.

7. The method of claim 6, wherein the first pre-defined bit-depth is implicitly determined.

8. The method of claim 6, wherein the first pre-defined bit-depth is determined dependent on input bit-depth.

9. The method of claim 6, wherein the first pre-defined bit-depth is signalled in a bit stream at a sequence level, picture level or slice level.

10. The method of claim 6, wherein the data range for the x-gradient sums and the y-gradient sums, the reference differences, or both are limited to a second pre-defined bit-depth prior to being shifted by the first pre-defined bit-depth.

11. The method of claim 6, wherein the data range for the x-gradient sums and the y-gradient sums, the reference differences, or both are limited to a second pre-defined bit-depth after being shifted by the first pre-defined bit-depth.

12. An apparatus of video coding using Bi-directional optical flow (BIO) for a true bi-direction predicted block, the apparatus of video coding comprising one or more electronic circuits or processors arranged to:
  receive input data associated with a current block in a current picture, wherein the current block is coded using bi-direction prediction;
  determine a first reference block associated with the current block in a first reference picture from reference picture list 0 and a second reference block associated with the current block in a second reference picture from reference picture list 1, wherein the first reference block and the second reference block are pointed by true bi-direction motion vectors;
  derive first x-gradients and first y-gradients based on the first reference block, and second x-gradients and second y-gradients based on the second reference block;
  derive x-gradient sums based on the first x-gradients and the second x-gradients; deriving y-gradient sums based on the first y-gradients and the second y-gradients; and deriving reference differences between interpolated pixels in the first reference block and the second reference block; wherein a data range for the x-gradient sums and the y-gradient sums, the reference differences, or both are shifted by a first pre-defined bit-depth;
  derive x-motion offset and y-motion offset using first information, wherein the first information comprising the x-gradient sums, the y-gradient sums, and the reference differences;
  generate a refined predictor for the current block based on second information, wherein the second information comprising the x-motion offset and the y-motion offset; and
  encode or decode the current block based on the refined predictor.

* * * * *